United States Patent [19]
Craig

[11] 3,989,373
[45] Nov. 2, 1976

[54] AUTOMATIC FOCUSSING ATTACHMENT FOR PHOTOGRAPHIC ENLARGERS

[76] Inventor: Dwin R. Craig, 9447 Emory Grove Road, Gaithersburg, Md. 20760

[22] Filed: June 12, 1974

[21] Appl. No.: 478,769

[52] U.S. Cl. .................................. 355/56; 355/63
[51] Int. Cl.² ......................................... G03B 27/36
[58] Field of Search ................. 355/56, 57, 58, 59, 355/55, 63

[56] References Cited
UNITED STATES PATENTS

| | | | |
|---|---|---|---|
| 552,259 | 12/1895 | Peckinpaugh et al. | 355/56 |
| 1,423,997 | 7/1922 | Callier | 355/58 |
| 1,793,623 | 2/1931 | Konieczny | 355/58 |
| 3,371,577 | 3/1968 | Yatera | 355/56 |
| 3,445,162 | 5/1969 | Klatt | 355/56 |

Primary Examiner—L. T. Hix
Assistant Examiner—E. M. O'Connor
Attorney, Agent, or Firm—Blair & Brown

[57] ABSTRACT

An automatic focussing attachment for photographic enlargers for lengthening and shortening the length of the enlarger bellows to automatically focus the lens as the enlarger is raised and lowered to vary the size of the image. A pivoted link of variable effective length has one end connected to a point fixed with respect to the base of the enlarger and the opposite end portion connected to the focussing knob of the enlarger so that as the enlarger is raised and lowered on its support column the focussing knob will be rotated to maintain the focus of the lens. The variable effective length link has several forms including a plurality of pivoted leaves and a sliding telescoping mounting.

4 Claims, 9 Drawing Figures

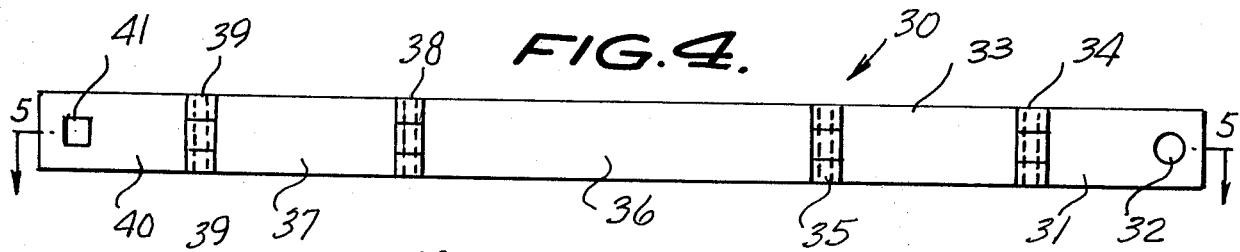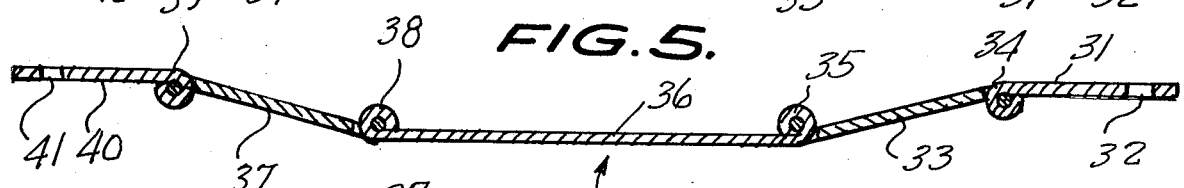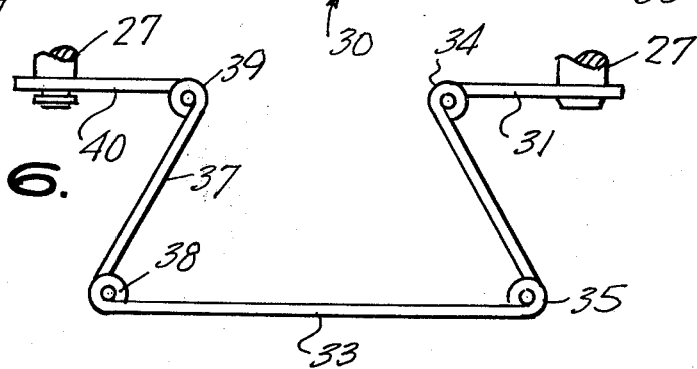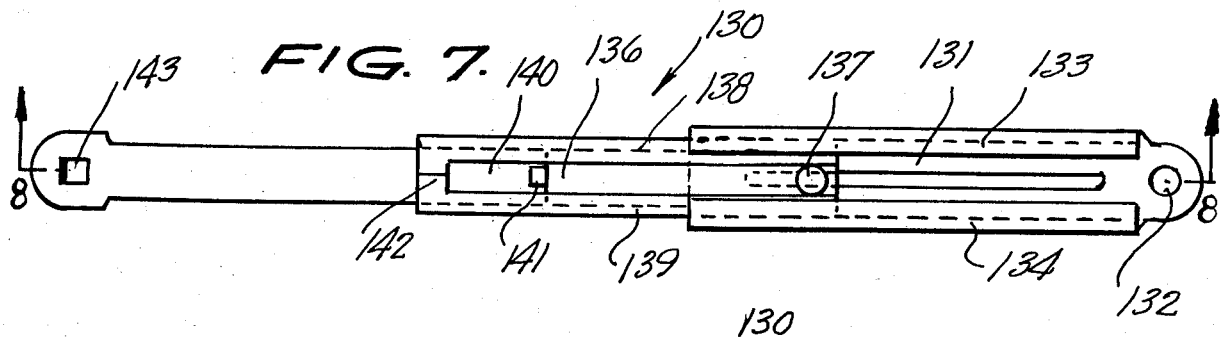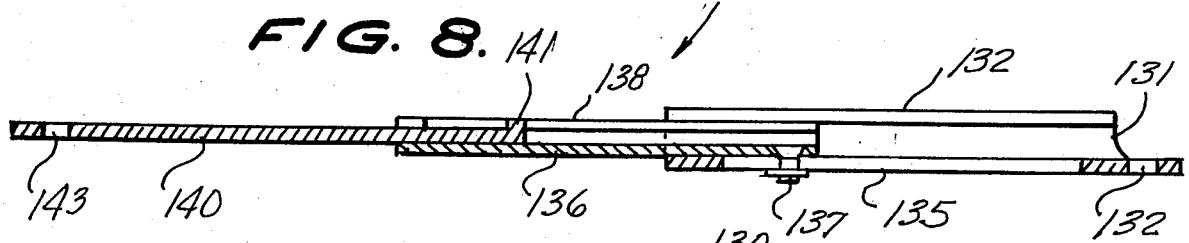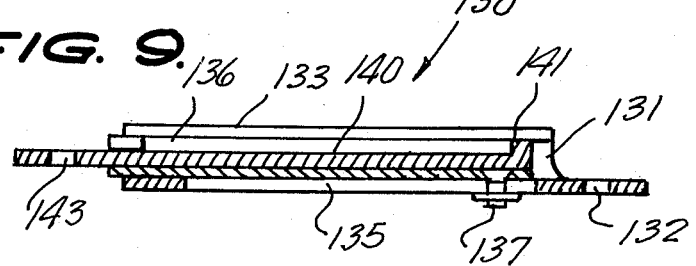

AUTOMATIC FOCUSSING ATTACHMENT FOR PHOTOGRAPHIC ENLARGERS

BACKGROUND OF THE INVENTION

FIELD OF THE INVENTION

The present invention relates to photographic enlargers and particularly to automatic focussing attachments therefor.

SUMMARY OF THE INVENTION

In a photographic enlarger of the type including a base and support column extending upwardly from the base an enlarger is mounted for vertical movement on the support column to vary the size of the projected image. The enlarger has a rotating hand adjustment for controlling the length of the bellows to focus the lens after a change in the image size. A link of variable effective length is pivotally connected at one end to the base of the enlarger and has its opposite end connected to the hand knob for varying the length of the bellows to maintain the lens in focus. The variable length linkage includes a plurality of pivoted leaves in one form of the invention and telescoping elements in another form of the invention. The variable length link is required since the distance between the knob for controlling the length of the bellows and any position on the base varies during the movement of the enlarger on the column.

The primary object of the invention is to provide an automatic focussing attachment for enlargers to maintain the lens in focus as the image size is changed.

Other objects and advantages will become apparent in the following specification when considered in light of the attached drawings.

BRIEF DESCRIPTION OF THE DRAWINGS

FIG. 4 is a side elevation of the variable length link;
FIG. 5 is a longitudinal sectional view taken on the line 5—5 of FIG. 4, looking in the direction of the arrows;
FIG. 6 is a top plan view of the link in contracted position;
FIG. 7 is a side elevation of a modified variable length link;
FIG. 8 is a longitudinal sectional view taken on the line 8—8 of FIG. 7, looking in the direction of the arrows;
and
FIG. 9 is a view similar to FIG. 8 with the elements in their shortened position.

DESCRIPTION OF THE PREFERRED EMBODIMENTS

Figure 1:
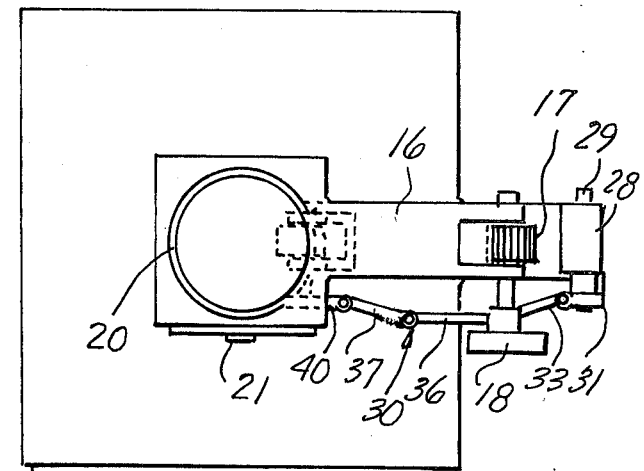
FIG. 1 is a top plan view of the invention.

Referring now to the drawings in detail, wherein like reference characters indicate like parts throughout the several figures, the reference numeral 10 indicates generally an auto focus attachment for photographic enlargers constructed in accordance with the invention.

Figure 2:
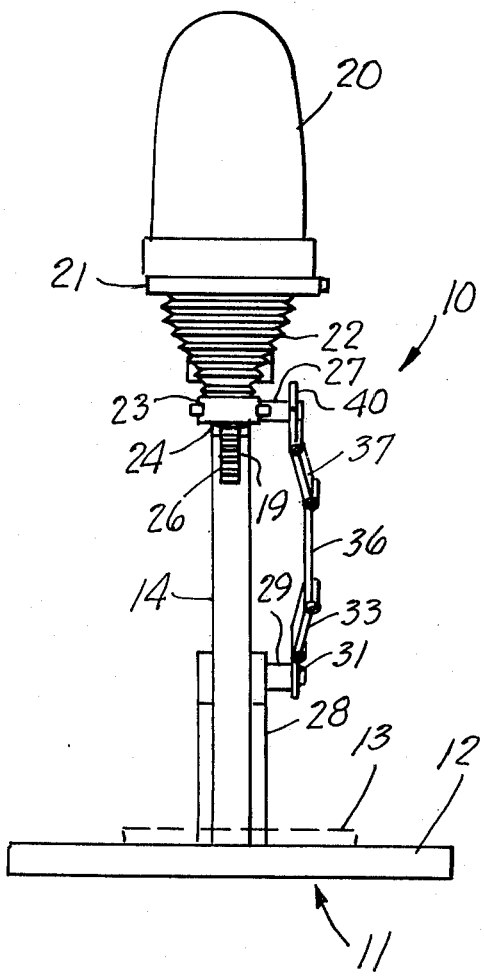
FIG. 2 is a front elevation of the invention.
Figure 3:
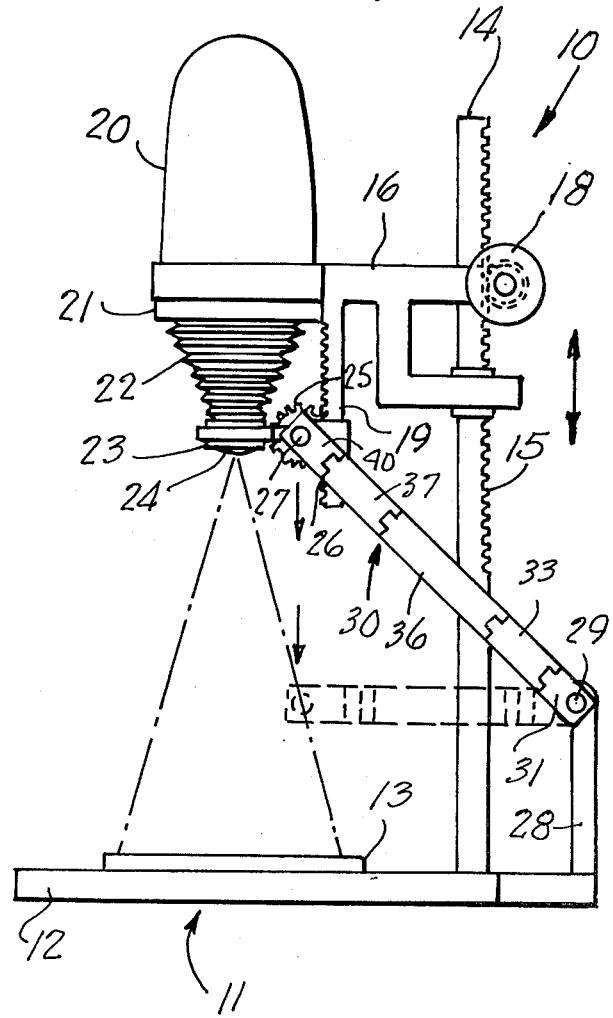
FIG. 3 is a side elevation of the invention.

The auto focus attachment for photographic enlargers is illustrated in FIGS. 1 through 3 as attached to a conventional enlarger indicated generally at 11. The enlarger 11 includes a base 12 adapted to support an easel 13 on which photographic paper is mounted for exposure during the enlarging process. A column 14 is rigidly secured to the base 12 and extends upwardly therefrom including a rack portion 15 as can be seen in FIG. 3. An enlarger head 16 is mounted for vertical movement on the column 14 and includes a gear 17 meshing with the rack 15 and controlled by a hand wheel 18. Rotation of the hand wheel 18 causes the enlarger head 16 to move vertically on the column 14.

A rack bar 19 depends from the enlarger head 16 for reasons to be assigned. A light housing 20 extends upwardly from the enlarger head 16 for containing the projection bulb (not shown). A negative carrier 21 underlies the enlarger head 16 and has a bellows 22 connected thereto and depending therefrom. A lens mount 23 is secured to the lower end of the bellows 22 and includes a lens 24. The lens mount 23 is mounted for vertical sliding movement on the rack bar 19 and has a gear 25 journalled thereon and meshing with the rack 26 of the rack bar 19. The gear 25 is mounted on a shaft 27 which is journalled in the lens mount 23.

The enlarger construction described above is completely conventional and applicant's auto focus attachment is used therewith as described below.

A post 28 is rigidly secured to the base 12 and extends upwardly therefrom along one edge of the base 12. A shaft 29 is journalled in the upper end of the post 28 and extends parallel to the base 12. A link arm generally indicated at 30 includes a leaf 31 having a bore 32 therein for receiving the shaft 29 which is rigidly connected to the leaf 31. A second leaf 33 is connected by a hinge connection 34 to the leaf 31 and by a hinge connection 35 to a leaf 36. A leaf 37 is connected by a hinge connection 38 to the leaf 36 and by a hinge connection 39 to a leaf 40. A rectangular aperture 41 is formed in the leaf 40 and the shaft 27 extends therethrough for rigid connection therewith.

In the use and operation of the invention as illustrated in FIGS. 1 through 6 the enlarger head 16 is raised and lowered by rotating the hand knob 18 so as to rotate the gear 17 with respect to the rack 15. As the enlarger head 16 raises and lowers on the column 14 the link arm 30 pivots on the post 28 and rotates the shaft 27 and thus the gear 25 to lengthen or shorten the bellows 22 and thus focus the lens 24.

As the enlarger head 16 lowers the shaft 27 approaches the shaft 29 and the link arm 30 partially folds into the position illustrated in FIG. 6 while still retaining it's relationship with shafts 29, 27.

A modified link arm is indicated generally at 130 in FIGS. 7 through 9. The link arm 130 includes a plate 131 having a bore 132 extending through one end thereof for rigid connection to the shaft 27. The plate 131 has opposed channel guides 133 and 134 integrally formed on its opposite side edges in opposed parallel relation. The plate 131 has an elongate slot 135 formed therein intermediate the channel members 133, 134. A second plate 136 is telescopically mounted in the plate 131 and includes a pin 137 slidably mounted in the slot 135. The plate 136 has opposed channel members 138, 139 on opposite sides thereof to receive a plate 140 slidably mounted therein. A stop 141 is integrally formed on the plate 140 for engagement with transverse element 142 on the plate 140.

A generally rectangular aperture 143 is formed in the end of the plate 140 to receive the shaft 27 therein.

The use and operation of the telescoping link arm 130 is identical to that of the link arm 30 described above.

Having thus described the preferred embodiments of the invention it should be understood that numerous structural modifications and adaptations may be resorted to without departing from the spirit of the invention.

What is claimed is:

1. A combined automatic focussing attachment and photographic enlarger including a base, an upright column rigidly secured to the base and extending upwardly therefrom, an enlarger head mounted for hand adjustable vertical sliding linear movement on said column, a bellows depending from said enlarger head, means depending from said enlarger head cooperating with means connected to the lower end of said bellows for hand adjusting the length of said bellows, a lens supported on the lower end of said bellows, said attachment comprising a link arm of adjustable effective length, means pivotally mounting one end of said arm rigidly with respect to said base, and means connected to the other end of said arm for automatically adjusting said hand adjusting means for varying the length of said bellows as said enlarger head is raised and lowered on said column with said link arm changing in effective length as said enlarger head is raised and lowered.

2. A device as claimed in claim 1 wherein the means for pivotally mounting said link arm rigidly to said base includes a post extending upwardly from said base, a shaft journalled in said post, and means rigidly securing said link arm to said shaft at one end of said link arm.

3. A device as claimed in claim 1 wherein said link arm comprises a plurality of leaves hingedly secured together.

4. A device as claimed in claim 1 wherein said link arm comprises a plurality of sections telescopically secured together.

* * * * *